(12) United States Patent
Rother

(10) Patent No.: US 6,567,500 B2
(45) Date of Patent: May 20, 2003

(54) VACUUM ENCLOSURE FOR A VACUUM TUBE TUBE HAVING AN X-RAY WINDOW

(75) Inventor: Peter Rother, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/967,355

(22) Filed: Sep. 28, 2001

(65) Prior Publication Data

US 2002/0075999 A1 Jun. 20, 2002

(30) Foreign Application Priority Data

Sep. 29, 2000 (DE) .......................................... 100 48 833

(51) Int. Cl.[7] ................................................ H01J 35/18
(52) U.S. Cl. ........................................ 378/140; 378/121
(58) Field of Search .................................. 378/121, 140

(56) References Cited

U.S. PATENT DOCUMENTS

| 4,762,559 A | * | 8/1988 | Penrice et al. ................. 75/248 |
| 5,369,268 A | * | 11/1994 | Van Aller et al. ..... 250/214 VT |
| 5,848,124 A | * | 12/1998 | Inazuru ....................... 378/140 |
| 5,884,864 A | * | 3/1999 | Sunne et al. ................. 244/121 |
| 6,134,299 A | * | 10/2000 | Artig ........................... 378/121 |

FOREIGN PATENT DOCUMENTS

| DE | OS 19638150 | 4/1998 | | |
| DE | OS 19845755 | 4/2000 | | |
| FR | 2676016 A1 | * | 11/1992 | ............ B23K/1/19 |

* cited by examiner

Primary Examiner—Drew A. Dunn
Assistant Examiner—Allen C. Ho
(74) Attorney, Agent, or Firm—Schiff Hardin & Waite

(57) ABSTRACT

A vacuum casing for a vacuum tube has an X-ray window which is formed of vitreous carbon and is joined to the vacuum enclosure by an active brazing alloy.

17 Claims, 2 Drawing Sheets

VACUUM ENCLOSURE FOR A VACUUM TUBE TUBE HAVING AN X-RAY WINDOW

BACKGROUND OF THE INVENTION

1. Field of the Invention

The present invention relates to a vacuum enclosure having an X-ray window which is formed of vitreous carbon.

2. Description of the Prior Art

Vitreous carbon (glassy graphite), as is known from German OS 196 38 150, is suitable as a material for X-ray windows of vacuum tubes, e.g. X-ray tubes, but also X-ray image intensifiers, because it is nontoxic and is significantly less expensive than the materials which have been used hitherto, e.g. beryllium. The use of vitreous carbon as a material for X-ray windows of vacuum tubes, however, has in practice failed since it has been impossible to produce a sufficiently durable vacuum-tight joint between an X-ray window made from vitreous carbon and the materials, for example metal or ceramic, which are usually employed as material for vacuum enclosures of vacuum tubes.

The primary problem above all is that the solders which are customarily used in vacuum technology only wet vitreous carbon to an insufficient extent, and consequently a permanent vacuum-tight joint between the X-ray window and the vacuum casing is not guaranteed.

SUMMARY OF THE INVENTION

An object of the present invention is to provide a vacuum enclosure of the type described above having an improved joint between the X-ray window and the vacuum casing.

According to the invention, this object is achieved in a vacuum enclosure for a vacuum tube having an X-ray window which is formed of vitreous carbon and is joined to the vacuum casing by soldering using an active brazing alloy, the active brazing alloy preferably being a material which is marketed as Incusil ABA (Active Brazing Alloy) by Wesgo Metals, USA.

As used herein the term active brazing alloy means a brazing alloy which directly wets glassy graphite. The basis for the wetting is the formation of layers known as reaction layers which are formed by interface reaction in the brazing alloy-glassy graphite interface region. To enable these active brazing reaction layers to form, the brazing alloys which are to be used are doped with particularly reactive metals, such as for example Ti, Hf, Zr, Ns, etc. During the soldering, these active components diffuse at the interfaces and break down the graphite surface so as to form reaction products which in turn can be wetted by the brazing matrix. Due to the constituents of the brazing alloys, they are known as active brazing alloys.

Surprisingly, it has been found that active brazing alloys wet vitreous carbon without problems, generally without any special prior treatment of the vitreous carbon. Accordingly, in the case of the vacuum enclosure according to the invention, the X-ray window is joined to the vacuum enclosure permanently, in a vacuum-tight manner and, moreover, in an inexpensive way, namely by soldering.

A further problem, associated with the high temperatures which arise in particular for X-ray tubes, is that vitreous carbon has a coefficient of thermal expansion which, at $2.6 \times 10^{-6}$ µm/° C., is low compared to that of materials which are usually employed for vacuum casings, so that the risk of the joint breaking open is very high.

This is remedied, according to an embodiment of the invention, by providing a frame-like structure of tungsten or a tungsten alloy, to which the X-ray window is fitted in a vacuum-tight manner by means of the active brazing alloy. Tungsten or tungsten alloys have a coefficient of expansion which is approximately twice as large as that of vitreous carbon and changes to only an insignificant extent as a function of temperature. Consequently, the risk of the X-ray window being damaged as a result of the different coefficients of thermal expansion of the material of the vacuum enclosure and of the X-ray window is reduced.

In a further embodiment of the invention the vacuum enclosure also has a frame-like support of tungsten or a tungsten alloy, to which the frame-like structure provided with the X-ray window is fitted in a vacuum-tight manner by welding or soldering. Production of a vacuum enclosure of this type preferably ensues by first fitting the frame-like support to the vacuum enclosure, then the frame-like structure is fitted to the X-ray window. It is then possible to join the unit formed by the X-ray window and its frame-like structure to the vacuum enclosure provided with the frame-like support without problems in a vacuum-tight manner by conventional welding or soldering processes, since identical or similar materials, namely tungsten or tungsten alloys, are being soldered or welded to one another.

Suitable tungsten alloys are alloys marketed by Plansee under the trade name DENSIMET®, which have tungsten contents of more than 90% and also contain nickel and iron or nickel and copper.

DESCRIPTION OF THE PREFERRED EMBODIMENTS

Figure 1:
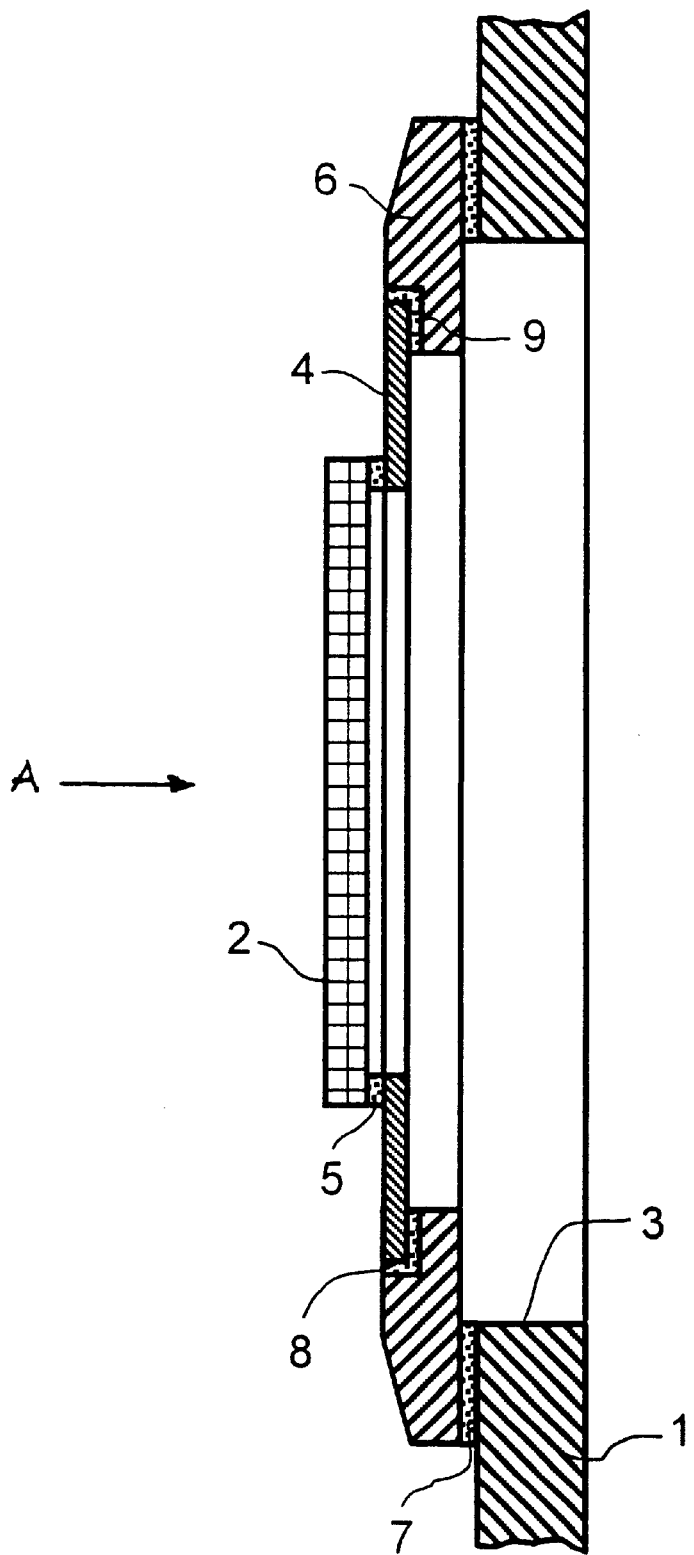
FIG. 1 shows, in longitudinal sections, the region of the wall of a vacuum enclosure according to the invention in which an X-ray window is displayed.

FIG. 1 shows the wall 1 of the vacuum enclosure of a vacuum tube, for example an X-ray tube or an X-ray image intensifier, in which an X-ray window 2 is disposed. The wall 1 of the vacuum enclosure in the region of the X-ray window consists, for example, of copper, Vacon or stainless steel. The X-ray window 2 itself consists of vitreous carbon, as is marketed, for example, under the trade name SIGRADUR® by Schott.

The X-ray window 2 is not directly joined to the wall 1 of the vacuum casing, which has an opening 3 in the region of the X-ray window 2. Rather, it is fitted in a vacuum-tight manner to the inner edge of a frame-like structure 4 which is formed from tungsten or a tungsten alloy, for example DENSIMET®. The X-ray window is attached to the frame-like structure 4 by means of an active brazing alloy 5. The thickness of the active brazing alloy 5 situated between the X-ray window 2 and the frame-like structure 4 is shown exaggerated in FIG. 1.

A suitable active brazing alloy is in particular Incusil ABA, which contains 59% silver, 27.25% copper, 12.5% indium and 1.25% titanium.

During the production of the vacuum enclosure according to the invention, the X-ray window 2 with the frame-like structure 4 is not joined directly to the wall 1 of the vacuum enclosure. Rather, the wall 1 of the vacuum casing is provided with a frame-like support 6 along the edge of the opening 3. This support 6, like the frame-like structure 4, is formed of tungsten or a tungsten alloy, in particular DENSIMET®, and is joined by soldering or welding. The thickness of the joining zone 7 between the frame-like support 6 and the wall 1 of the vacuum casing is shown exaggerated in FIG. 1.

To close the opening 3 by means of the X-ray window 2, the frame-like structure 4 and the frame-like support 6 are joined to one another by soldering, the thickness of the joining zone 8 being shown exaggerated in FIG. 1. In view of the fact that the frame-like structure 4 and the frame-like support 6 consist of similar if not identical materials, it is possible without problems to produce a durable vacuum-tight and temperature-resistant joint between the two said parts.

Figure 2:
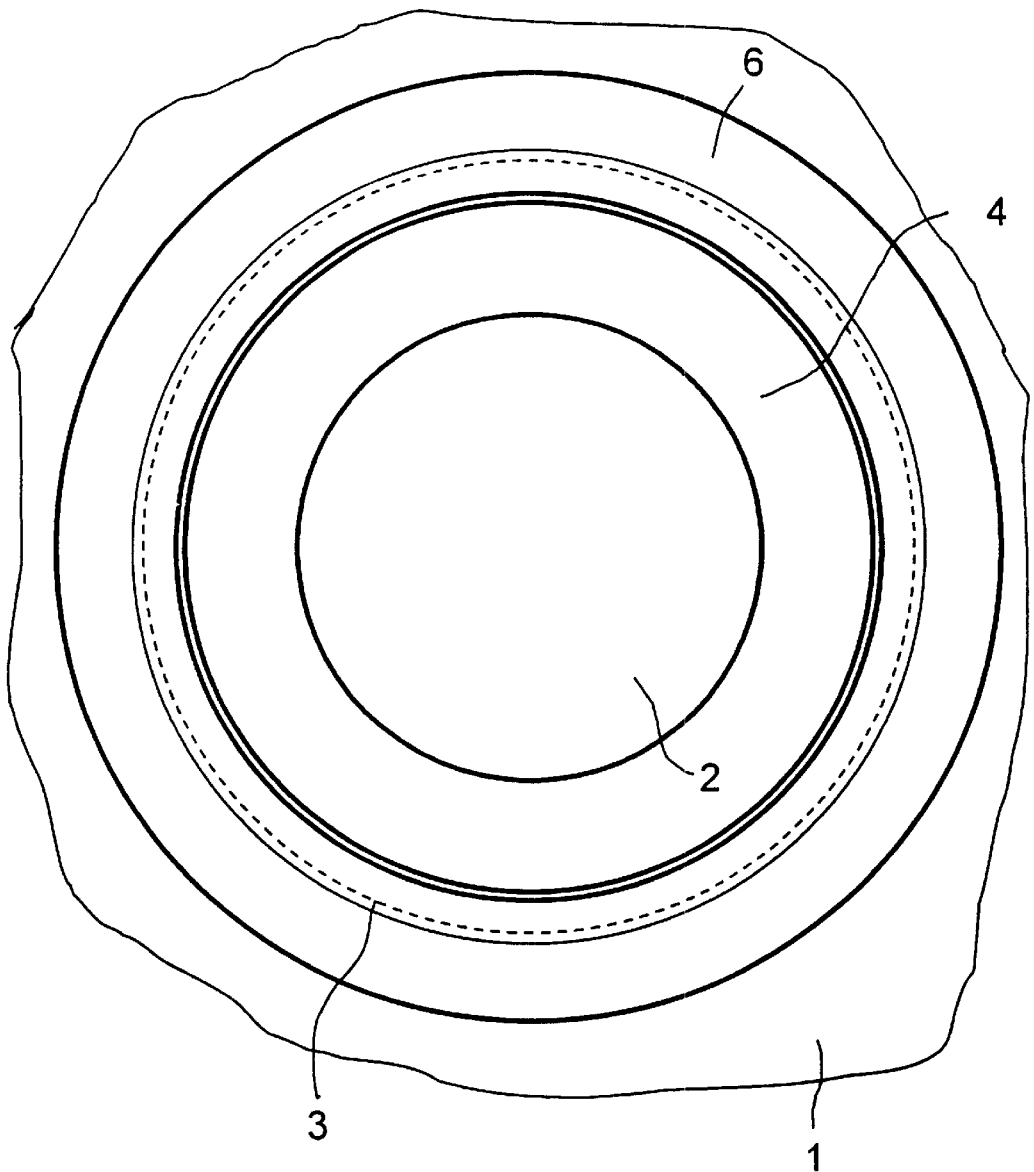
FIG. 2 shows a view in the direction of arrow A in FIG. 1.

As can be seen from FIG. 2 (which is a view as seen in the direction of arrow A in FIG. 1), in the exemplary embodiment described above, the opening 3, the X-ray window 2, the frame-like support 6 and the frame-like structure 4 are in the shape of a circle or a circular ring. Other shapes of these components, however, are possible within the scope of the invention.

In the exemplary embodiment, a centering arrangement is provided between the frame-like structure 4 and the frame-like support 6. The centering arrangement is formed by a recess 9, which interacts with the outer edge of the frame-like structure 4, in the frame-like support 6. A centering arrangement, which may be of similar or different design, also may be provided between the beam exit window 2 and the frame-like structure 4 and/or between the frame-like support 6 and the wall 1 of the vacuum enclosure.

As has been mentioned, the vacuum enclosure illustrated in the figures may either be the vacuum casing of an X-ray tube or the vacuum enclosure of an image intensifier; in the former case, the X-rays pass from the evacuated interior of the vacuum enclosure through the X-ray window into the surrounding medium, while in the latter case the X-rays pass from the medium surrounding the vacuum casing through the X-ray window into the interior of the vacuum enclosure.

Although modifications and changes may be suggested by those skilled in the art, it is the intention of the inventor to embody within the patent warranted hereon all changes and modifications as reasonably and properly come within the scope of his contribution to the art.

I claim as my invention:

1. A vacuum enclosure for a vacuum tube, comprising:
   an enclosure wall;
   an X-ray window composed of vitreous carbon; and
   a solder joint connecting said X-ray window to said enclosure wall formed by an active brazing alloy containing 59% silver, 27.25% copper, 12.5% indium and 1.25% titanium.

2. A vacuum enclosure as claimed in claim 1 comprising a frame-like structure composed of a material selected from the group consisting of tungsten and tungsten alloys, to which said X-ray window is fitted vacuum-tight by said active brazing alloy.

3. A vacuum enclosure as claimed in claim 2 wherein said frame-like structure is comprised of a tungsten alloy containing more than 90% tungsten, and also containing nickel, and a material selected from the group consisting of iron and copper.

4. A vacuum enclosure as claimed in claim 2 further comprising a frame-like support composed of a material selected from the group consisting of tungsten and tungsten alloys, to which said frame-like structure with said X-ray window is fitted vacuum-tight.

5. A vacuum enclosure as claimed in claim 4 wherein said frame-like support is fitted to said frame-like structure by welding.

6. A vacuum enclosure as claimed in claim 4 wherein said frame-like support is fitted to said frame-like structure by soldering.

7. A vacuum enclosure as claimed in claim 4 wherein said frame-like structure is comprised of a tungsten alloy containing more than 90% tungsten, and also containing nickel, and a material selected from the group consisting of iron and copper.

8. A vacuum enclosure for a vacuum tube, comprising:
   an enclosure wall;
   an X-ray window composed of vitreous carbon;
   a frame-like structure composed of a tungsten alloy containing more than 90% tungsten, and also containing nickel, and a material selected from the group consisting of iron and copper, to which said X-ray window is fitted by a vacuum-tight joint; and
   a vacuum-tight connection between said frame-like structure and said enclosure wall.

9. A vacuum enclosure as claimed in claim 8 wherein said vacuum-tight connection includes a joint formed by an active brazing alloy.

10. A vacuum enclosure as claimed in claim 9 wherein said active brazing alloy contains 59% silver, 27.25% copper, 12.5% indium and 1.25% titanium.

11. A vacuum enclosure as claimed in claim 8 wherein said vacuum-tight connection includes a frame-like support to which said frame-like structure with said X-ray window is fitted vacuum-tight, and a vacuum-tight joint between said frame-like support and said enclosure wall.

12. A vacuum enclosure as claimed in claim 11 wherein said frame-like support is fitted to said frame-like structure by welding.

13. A vacuum enclosure as claimed in claim 11 wherein said frame-like support is fitted to said frame-like structure by soldering.

14. A vacuum enclosure for a vacuum tube comprising:
   an enclosure wall;
   an X-ray window composed of vitreous carbon;
   a frame-like structure to which said X-ray window is fitted vacuum-tight;
   a frame-like support composed of a tungsten alloy containing more than 90% tungsten, and also containing nickel, and a material selected from the group consisting of iron and copper, to which said frame-like structure with said X-ray window is fitted vacuum-tight; and
   a vacuum-tight connection between said frame-like support and said enclosure wall.

15. A vacuum enclosure as claimed in claim 14 wherein said frame-like support is fitted to said frame-like structure by welding.

16. A vacuum enclosure as claimed in claim 14 wherein said frame-like support is fitted to said frame-like structure by soldering.

17. A vacuum enclosure as claimed in claim 14 wherein said X-ray window is fitted to said frame-like structure by a vacuum-tight joint formed by an active brazing alloy containing 59% silver, 27.25% copper, 12.5% indium and 1.25% titanium.

* * * * *